March 18, 1958     I. E. COX     2,827,343
AXLE BEARINGS

Filed Feb. 21, 1955     3 Sheets-Sheet 1

Inventor
Isaac Eugene Cox
By Wallace and Cannon
Attorneys

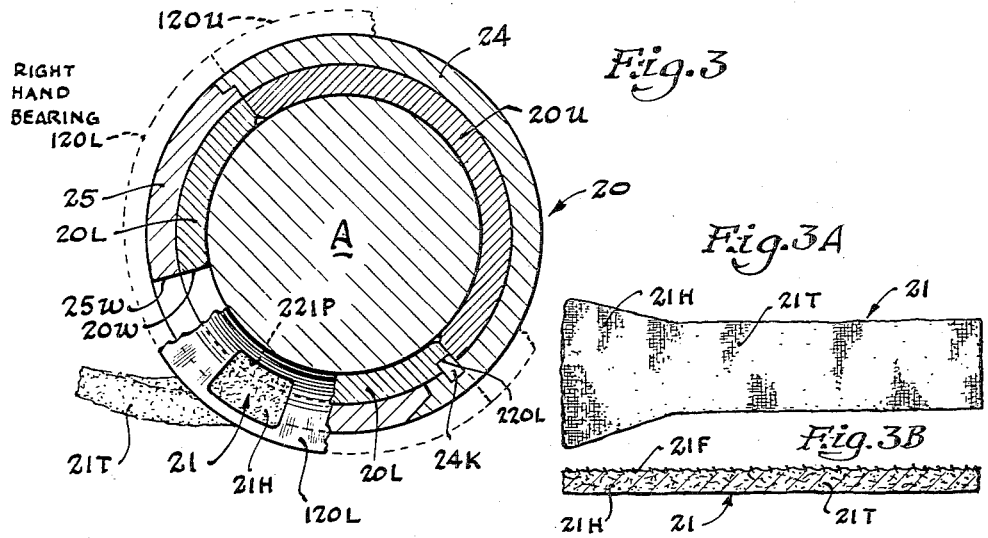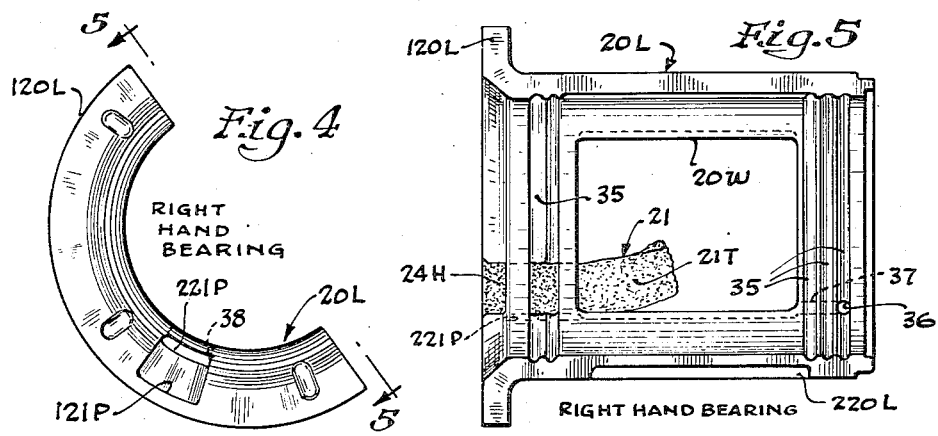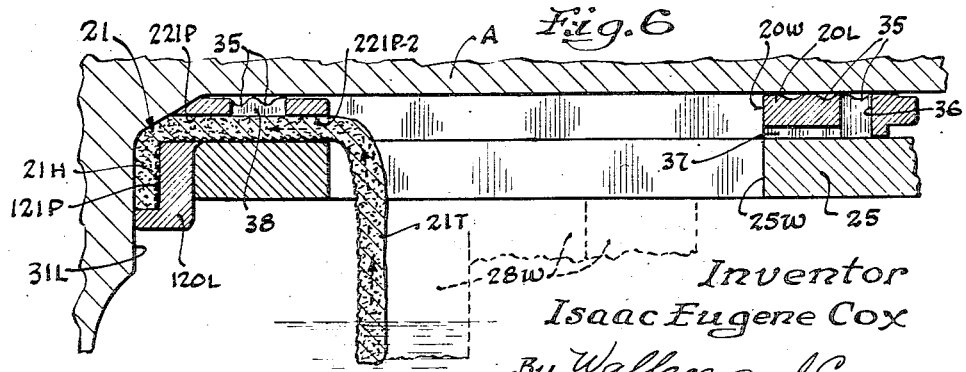
Inventor
Isaac Eugene Cox
By Wallace and Cannon
Attorneys March 18, 1958 — I. E. COX — 2,827,343
AXLE BEARINGS
Filed Feb. 21, 1955 — 3 Sheets-Sheet 3

Inventor
Isaac Eugene Cox
By Wallace and Cannon
Attorneys

United States Patent Office 2,827,343
Patented Mar. 18, 1958

2,827,343

AXLE BEARINGS

Isaac Eugene Cox, Kirkwood, Mo., assignor to American Brake Shoe Company, New York, N. Y., a corporation of Delaware Application February 21, 1955, Serial No. 489,617

7 Claims. (Cl. 308—132)

This invention relates to collared sectional axle bearings and particularly to such bearings of the kind used in connection with axle-hung motors in railway locomotives, cranes, shovels and the like.

Such axle-hung motors are conventionally mounted in such a way that one side of the motor is carried by the truck frame or the like while the other side of the motor is carried on the axle that is driven by the motor, and it is in hanging the one side of the motor on such axle that collared split bearings of the kind to which this invention relates are used. The axle in such installations has a driving gear fixed thereon which is driven by the motor pinion and the bearings of the present invention are mounted in the motor frame in surrounding relation to the axle so that the end collars of the bearings have an end thrust bearing respectively with the gear hub face and the opposite wheel hub face.

Conventional bearings used for this purpose have the inner bearing surfaces thereof lubricated by wick lubricators disposed within the windows of the window sections of the bearings and such lubricators feed oil from reservoirs that are afforded adjacent the bearing. While such conventional lubricators adequately lubricate the inner bearing surfaces, it is found in practice that adequate lubrication is not attained on the thrust bearing surfaces of the collar, and excessive and objectionable wear is experienced in the collar or thrust bearing portions of the bearing.

In view of the foregoing it is the primary object of the present invention to enable proper and sufficient lubrication of the thrust bearing surfaces of such bearings to be attained, and a related object is to enable this to be accomplished in such a way that no changes or revisions are required in the axle cap, the conventional lubricator or other standardized elements of the bearing mounting and lubricating means. More specifically, it is an object to incorporate wick lubricating means in a bearing for axle-hung motors, and related objects are to do this in such a way that the conventional lubricant source may serve as the source of oil, and to so relate the wick means to the bearing that conventional installation procedures may be followed. A further and more specific object is to relate the wick to the bearing in such a way as to prevent inadvertent displacement of the wick from its operative relation.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 3 is a vertical sectional view illustrating a bearing embodying the invention;

Fig. 3A is a plan view of a lubricating wick used in the bearing;

Fig. 3B is a side elevational view of the wick;

Fig. 4 is an end elevational view of the window section of a right hand bearing;

Fig. 5 is an inside elevational view of the window section taken substantially along the line 5—5 of Fig. 4;

Fig. 6 is a schematic sectional view showing the bearing in its position of use;

Figure 1:
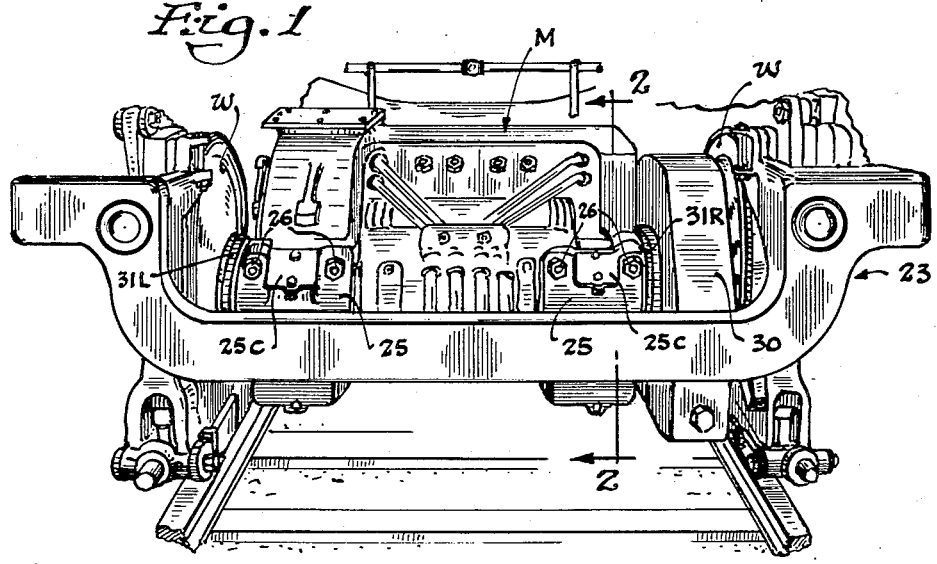
Fig. 1 is a front perspective view of an axle-hung motor of the kind in which bearings embodying the present invention may be used.

For purposes of disclosure the invention is illustrated as embodied in the window section 20L of a sectional bearing 20, the section 20L having a window 20W therein and the sectional bearing 20 also including a mating upper section 20U. The sectional bearing 20 herein shown is made in right and left hand embodiments and is particularly adapted for use in mounting an axle-hung motor M, and under the present invention improved lubrication and longer bearing life are attained through the provision of lubricating means including a wick 21 for lubricating the collar or thrust bearing surfaces. The axle-hung motor M is illustrated in Fig. 1 as incorporated in a locomotive truck 23 of conventional form in which an axle A, Figs. 3 and 6, having wheels W, is mounted in the usual way. The motor M is disposed between the axle and the conventional central bolster of the truck, one side of the motor M being supported on such central bolster while the other side of the motor M is supported by bearings 20 on the axle A, as will be described.

Figure 2:
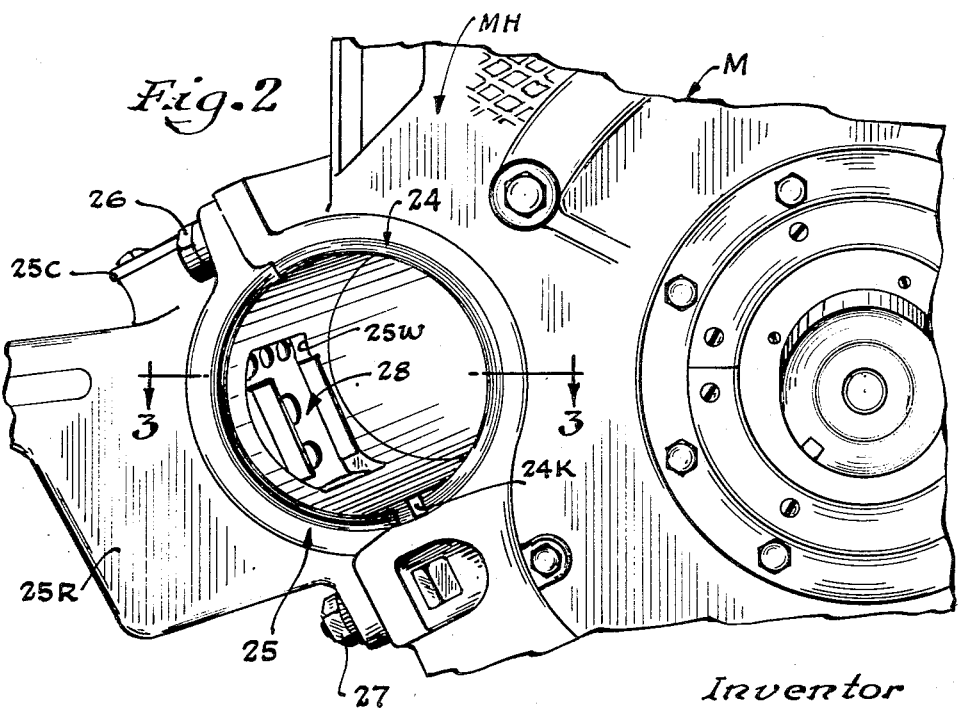
Fig. 2 is a fragmental side perspective of the structure shown in Fig. 1.

The motor M has its housing MH, Figs. 1 and 2, formed with an integral axle bearing housing 24 adjacent each end for cooperation with removable axle caps 25 to locate the sectional bearings 20 about the axle A. The axle bearing housing 24 and the axle cap 25 are each semicircular in general form and are held in the mating relation by cap screws 26 and bolts 27. As will be evident in Figs. 2 and 3, the meeting plane of the housing 24 and the cap 25 is disposed at an angle to the vertical according to usual practice, and when the bearing 20 is put in place, the sections thereof meet in substantially this same place. Each axle cap 25 has an integral lubricant reservoir 25R formed thereon, and access may be had to the reservoirs 25R through removable covers 25C. Each cover 25C carries a felt wick holder 28 which extends in a conventional manner downwardly from the cover 25C and into the upper portion of the reservoir 25R so as to be located in a window 25W formed in the axle cap 25 as shown in Figs. 2 and 3. The wick holder 28 is arranged in the conventional manner to carry a plurality of felt wicks 28W, shown in dotted outline in Fig. 6, and to press the upper ends of such wicks 28W into the window 20W and resiliently against the surface of the axle A opposite the window 20W. The lower ends of the wicks 28W depend from the lower end of the holder through the opening or window 25W into the supply of oil in the reservoir 25R, and thus lubrication is applied to the outer surfaces of the axle A, as will be discussed in further detail hereinafter.

The axle bearing housings 24 and their related axle caps 25 are so located endwise of the motor housing MH that the sectional bearings 20 may have thrust bearing engagement in opposite directions with elements that are carried on the axle A near opposite ends. Thus, at the right hand end of the axle A, and adjacent the right hand wheel W, the driving connection from the motor M to the axle is afforded by a conventional pinion and gear arrangement, enclosed in a housing 30, and the gear of this drive has an annular gear hub face 31R facing toward the left in Fig. 1. At the opposite or left hand end of the axle, as shown in Fig. 1, a similar annular wheel hub face 31L is afforded on the wheel W so as to face toward the right in Fig. 1.

The thrust-bearing engagement with the faces 31L and 31R is afforded by flanges or collars 120L and 120U that are formed on the ends of the respective sections 20L and 20U. The collar 120U is in most respects conventional in form and function, and the same is generally true in respect to the collar 120L except that provision is made under the present invention, as will be described, for assuring continuous and adequate lubrication of the thrust bearing surfaces. In this respect it is important that in attaining such lubrication the conventional form of the bearing sections and their collars is maintained insofar as general external form may be concerned, for by reason of this fact, the present bearing is rendered capable of use in conventional axle-mounted motor installations.

Figure 7:
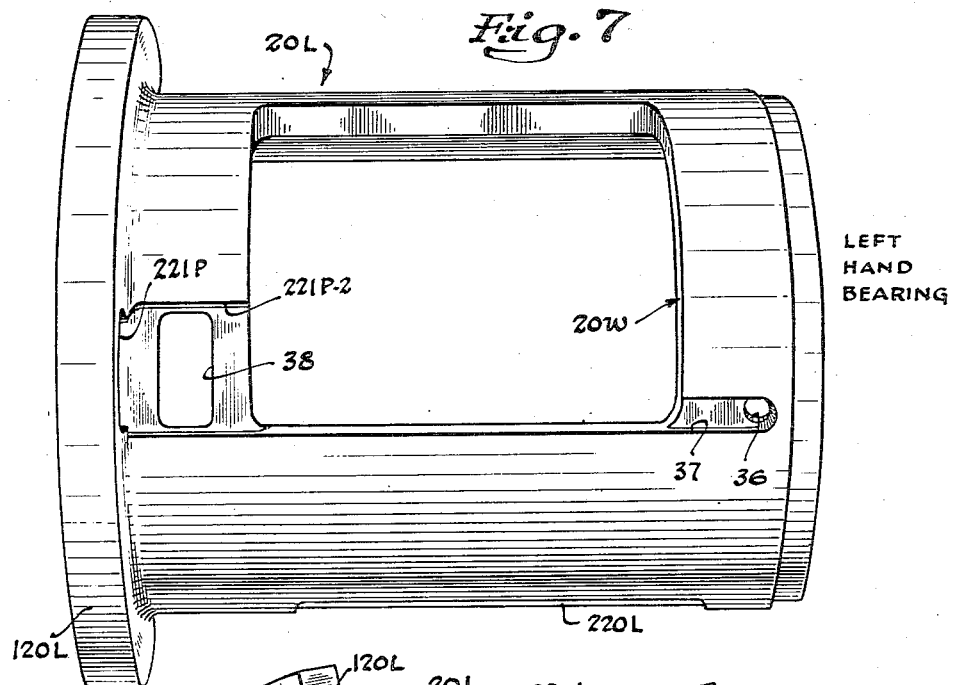
Fig. 7 is an outside perspective view of the window section of a left hand bearing embodying the invention.
Figure 8:
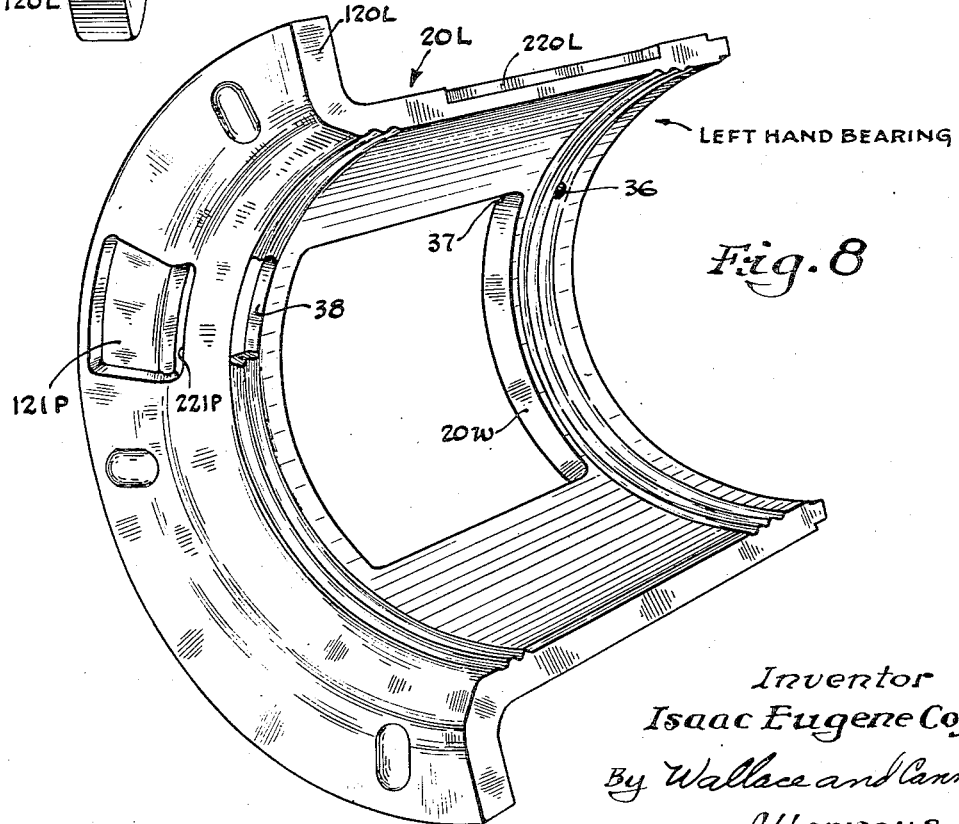
Fig. 8 is an inside perspective view of the bearing section shown in Fig. 7.

Thus the upper and lower bearing sections 20U and 20L are formed as semi-cylindrical or half-bearing elements with their longitudinal edge surfaces formed in mating diametric planes, and at its lower outer corner the lower section 20L has a rabbeted groove or keyway 220L formed therein for engagement with a key 24K that is mounted in the axle bearing housing 24 near the lower edge thereof. In this relation it is important to note that in providing the right and left hand units, the keyway 220L is disposed in one edge of the right hand section 20L, as shown in Figs. 3, 4 and 5, while in the left hand section 20L, as shown in Figs. 7 and 8, the groove 220L is located in the other edge of the section. A similar change in location of the wick 21 and the related structural elements is also involved as between right and left hand bearing sections, the specific purpose being to locate the wick 21 adjacent to the lower edge of the window 20W, as will be described.

When a bearing 20 is in position, as shown for example with respect to a right hand bearing in Fig. 3, with the meeting plane of the sections disposed in the normal angular relation as hereinbefore described, the lower edge of the window 20W is located a short distance laterally of the lowermost point of the bearing, and the window 20W is in substantial registry with the window of the axle cap 25, as shown in Figs. 3 and 6. The location of the wick 21 that is afforded under the present invention is related to the window location that is thus established and as will be evident in Fig. 3, the wick 21 is disposed opposite the lowermost portions of the window 20W so as to simplify and facilitate the extension of the wick 21 from its lubricating position past the lower lubricating portions of the wicks 28W and to the lubricant source in the reservoir 25R.

In thus mounting and locating the wick 21, both the wick 21 and the recesses and passages in which the parts of the wick are located are given a special and complemental form. Thus as shown in Figs. 3A and 3B, the wick 21 is formed from a heavy felt with a head portion 21H of trapezoidal form, and an elongated integral tail portion 21T is extended from the narrow edge of the head 21H. Thus the tail portion 21T is narrower than the widest part of the head 21H. The wick 21 is preferably reenforced or strengthened by a layer 21F of fabric adhesively fixed to one face of the felt from which the wick is made.

To receive and position the wick 21 that is thus afforded, the outer or thrust bearing face of the collar 120L has a mounting recess or pocket 121P formed therein, and this pocket 121P is complemental in size and shape to the head 21H of the wick 21 and is located so that the longer or base edge of the trapezoid is close to but spaced somewhat from the outer edge of the collar 120L, while the corner defined at the lower end of the shorter edge of the trapezoid is located substantially aligned with the lower edge of the window 20W as shown in Fig. 5. From the upper edge of the pocket 121P a clearance passage 221P is formed so as to extend from the pocket 121P through the adjacent side of the window 20W. The passage 221P is spaced outwardly from the inner or radial bearing surface of the section 20L, and in the present instance is formed in part as a relatively wide and shallow groove 221P-2 formed in the outer face of the section 20L, as will be evident in Figs. 6 and 7 of the drawings.

The passage 221P and the groove 221P-2 are of such a width and depth as to be complemental to the transverse cross section of the tail portion 21T of the wick 21, and hence the tail portion 21T may be drawn endwise from the outer side of the collar 120L through the passage 221P to such a point that the head 21H may be bent down into the complemental pocket 121P so as to be mechanically interlocked therewith in a manner that prevents endwise displacement of the wick head 21H inwardly into the passage 221P. The head 21P is, however, preferably secured adhesively in position in the pocket 121P, and this assures effectiveness of the aforesaid mechanical interlock. The tail portion 21T of the wick also is preferably secured adhesively in the groove portion 221P-2, thus to simplify handling of the bearing section during installation.

The tail portion 21T of the wick 21 is relatively long, as will be evident in Figs. 5 and 6, thus to enable the portion that extends beyond the end of the groove 221P to project downwardly through the windows 20W and 25W into the pool of lubricant in the reservoir 25R. During the mounting of the section 20L, the extended portion of the tail 21T is bent up so as to lie wholly within the window 20W, and this enables the bearing section 20L to be rocked or rolled in and relative to the cap 25 in the manner that is followed in conventional mounting operations.

The projecting portion of the wick tail 21T may then be bent down into its depending position of Fig. 6 by removing the cover 26C of the reservoir 25R and applying the requisite manipulating forces to the tail 21T through the opening disclosed by the removal of such cover. The cover 25 and associated wick holder 28 are then put in place in the usual manner to locate the wicks 28W within the bearing window 20W.

Oil that is applied to the inner bearing surfaces tends of course to escape endwise of the bearing, and a plurality of oil collecting grooves 35 are therefore provided in an annular relation adjacent to opposite ends of the inner bearing surfaces of the bearing sections 20L and 20U. The oil collected in the grooves 35 is re-used, and as to the groove 35 that is most remote from the collar, that is the groove 35 at the right hand of the bearing in Fig. 6, a return connection is provided to the reservoir 25R. This return connection is herein provided by a radial bore 36 extending through the bearing section from the aforesaid groove, and a passage from the outside end of the bore is afforded by a groove 37 extended longitudinally along the outside surface of the bearing to the adjacent edge of the window 20W. The form and location of the bore 35 and the groove 36 will be evident in Figs. 5, 6, 7, and 8 of the drawings, it being clear that these elements are substantially aligned with the lower edge of the window 20W.

At the other or collar end of the bearing the oil collected in the grooves 35 is re-used and conserved by applying the same to the wick 21. For this purpose a relatively large opening 38 is formed at the area where the grooves 35 are opposite the wick 21, or in other words, opposite 221P-2. The opening 38 thus affords a return connection for the oil collecting grooves 35 at the collar end of the bearing.

From the foregoing description it will be evident that the present invention enables proper lubrication of the thrust collars of axle-hung bearings to be attained, and this result may be accomplished in the usual bearing mounting structures that are found in the field. This interchangeable characteristic of the bearings afforded by the present invention also extends to the bearing mounting operations, and hence the bearings of the present invention may be readily and easily used in conventional equipment. Under the present invention the wick is mechanically locked in its position of use, and this wick is so related to the bearing that it may obtain its oil supply from the conventional oil source or reservoir.

Thus while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a bearing, a member affording an inner rounded bearing surface and having a radial collar at one end thereof affording a thrust bearing surface, said member having a window opening formed therein spaced from said collar and in which a wick lubricating means may be mounted to feed lubricant from a conventional source to said thrust bearing surface, said member having a passage formed longitudinally therein from said window opening and through the collar to said thrust bearing surface and in spaced relation to said inner bearing surface, a wick-receiving pocket of radial outward extent formed in said thrust bearing surface and having a depth less than the axial thickness of the collar, said pocket opening into said passage, and an oil groove formed in said inner bearing surface adjacent said collar and having a return connection communicating with said passage.

2. A bearing as defined in claim 1 in which an oil groove is formed adjacent the end of said inner bearing surface opposite said collar and which has a return connection extended to said window opening.

3. In a bearing, a member affording an inner rounded bearing surface and having a radial collar at one end thereof affording a thrust bearing surface, said bearing member having a window opening formed therein spaced from said collar and in which a wick lubricating means may be mounted to feed lubricant from a conventional source to said thrust bearing surface of said member, said member affording a longitudinal passage extended from said window opening to said thrust bearing surface and in spaced relation to said inner bearing surface, said collar having a wick-mounting pocket of radial outward extent formed in said thrust bearing surface and having a depth less than the axial thickness of said collar so as to afford a solid wall behind a wick disposed therein, said pocket being disposed so that a part thereof opens into said passage to enable such a wick to be extended through said passage from said window opening and into said pocket, and said inner bearing surface in the portion adjacent said collar having an annular oil groove formed therein communicating with said passage.

4. In a bearing, a member having an inner rounded bearing surface and an outer mounting surface, said member having a radial collar formed at one end thereof with inner and outer faces, the outer face of said collar affording a thrust bearing surface, said member having a window opening in which a wick lubricator may be disposed to feed oil to said thrust bearing surface from a lubricant source, said thrust bearing surface of said collar having a wick-receiving pocket formed therein of radial outward extent and of less depth than the axial thickness of said collar, said collar having a passage extended therethrough from said pocket to said outer mounting surface and through which a wick may extend from said pocket to said window opening.

5. A bearing according to claim 4 having a second opening aligned with said passage and extended outwardly through said member from said inner bearing surface thereof to said outer mounting surface, and an oil groove formed about said inner bearing surface and having an end communicating with said second opening.

6. A bearing member according to claim 5 having another oil groove formed about said inner bearing surface at the end of said member opposite said collar, and a return passage extended from said other oil groove to said window opening.

7. In a bearing for axle-hung motors, a bearing member affording an inner bearing surface and having a collar affording a radial thrust bearing surface, said bearing member having a window formed therein spaced from said collar and in which wick oiler means may be mounted to feed lubricant from a conventional source to said thrust bearing surface of said member, said member having a passage longitudinally thereof from said window and through said collar to said thrust bearing surface and in spaced relation to said inner bearing surface, said collar having a wick-receiving pocket of radial outward extent formed in said thrust bearing surface of less depth than the axial thickness of said collar and opening into said passage, said inner bearing surface having an annularly arranged oil groove adjacent to said collar, and said member having a return passage formed therein from said groove to said passage.

References Cited in the file of this patent

UNITED STATES PATENTS

| | | |
|---|---|---|
| 1,416,884 | Schmidt | May 23, 1922 |
| 1,733,401 | Christman | Oct. 29, 1929 |
| 1,955,604 | Peets et al. | Apr. 17, 1934 |
| 2,048,763 | Whiteley | July 28, 1936 |
| 2,054,912 | Riebe | Sept. 2, 1936 |

FOREIGN PATENTS

| | | |
|---|---|---|
| 403,561 | Great Britain | Dec. 28, 1933 |